CHARACTER SELECTOR AND GENERATING DEVICE

Filed Oct. 17, 1966 4 Sheets-Sheet 1

INVENTOR
Morton H. Lewin
BY H. Christoffersen
Attorney

INVENTOR
Morton H. Lewin
BY H. Christoffersen
Attorney

CHARACTER SELECTOR AND GENERATING DEVICE

Filed Oct. 17, 1966 4 Sheets-Sheet 3

INVENTOR
Morton H. Lewin
BY H. Christoffersen
Attorney

INVENTOR
Morton H. Lewin
BY H. Christoffersen
Attorney 3,523,161

CHARACTER SELECTOR AND GENERATING DEVICE

Morton H. Lewin, Princeton, N.J., assignor to RCA Corporation, a corporation of Delaware Filed Oct. 17, 1966, Ser. No. 587,079
Int. Cl. H04m *11/00*
U.S. Cl. 179—2 19 Claims

ABSTRACT OF THE DISCLOSURE

The combination of a keyboard and a conventional telephone, this combination being useful, for example, for communication with a remote computer. When a key on the keyboard is selected, for example by a hand-held conductive "pen," oscillations, indicative of the character represented by the selected key, are applied to the speaker of the telephone. In one embodiment of the invention, these oscillations are produced by conducting successive voltages appearing on the selected key, via the hand-held pen, to a circuit for translating these voltages to serially coded oscillations. In another embodiment of the invention, when the hand-held pen is placed in contact with a key, a pulse is applied via the pen and key to an encoder, and the latter causes to be produced a group of concurrent signals indicative of the character on the key.

This invention relates to character generating and transmitting devices and, in particular, to a character selector and generating device which is especially useful for telephone input to a computer.

The advent of time-sharing in data processors renders possible a system wherein any user has direct access to a computer via his telephone. At present, a typical time-sharing terminal, remote from a central computer, contains an automatic typewriter interfaced with a suitable data-set to a telephone or TWX line. The typewriter encodes actuated keys into digital output signals and decodes input binary codes into printed characters. The data-set acts as a modulator-demodulator to allow transmission of appropriately coded tones over a telephone line to the computer. Cost of such an arrangement is sufficiently high as to render its use impractical for the occasional user. The latter is true also of the more flexible input systems recently devised which are portable in nature and are not tied down to the use of a given data-set installation.

Systems are being developed in which computer-generated voice output messages are sent to users via telephone, e.g. stock quotation systems. It is desirable, therefore, that an inexpensive input device be devised for telephone input to a computer. Plans have been proposed to use conventional "touchtone" telephone handsets themselves as input devices in a system with computer generated voice outputs. These devices, however, have the disadvantage of providing the user with only numeric input capability, unless special and complicated code conventions are established to allow for full alphanumeric input.

Accordingly, it is an object of this invention to provide an improved input device for communicating with a data processor, e.g., a computer, via any conventional telephone.

It is a further object of this invention to provide an improved input device, of the type described above, which allows the user to input a complete alphanumeric character set, e.g., the 128 character ASCII set, without special coding conventions.

It is still another object of this invention to provide a device of the type immediately aforementioned which is portable and which can be used with any conventional telephone handset.

An input device embodying the invention comprises coded character signal generating means, an electronic "keyboard" having a plurality of electrically conductive "keys," one for each of the characters available for selection and transmission, and a selector "pen" or pointer which, when brought into contact with a key, completes a signal circuit through that key to the character generating means to control the generation thereby of a set of signals which identify the corresponding character. The output of the signal generating means preferably drives a speaker that may be clamped onto the input side of a telephone handset.

The keyboard and keys may comprise, for example, a panel of individual segments in the form of transparent conductive coatings on a glass substrate, which segments are insulated from one another, and through which the corresponding characters may be displayed from a printed card located on the other side of the substrate. As an alternative, the keys may be opaque metallic segments, insulated from one another and having the corresponding characters embossed thereon.

In the accompanying drawing, like reference characters denote like components, and:

GENERAL DESCRIPTION

Figure 1:
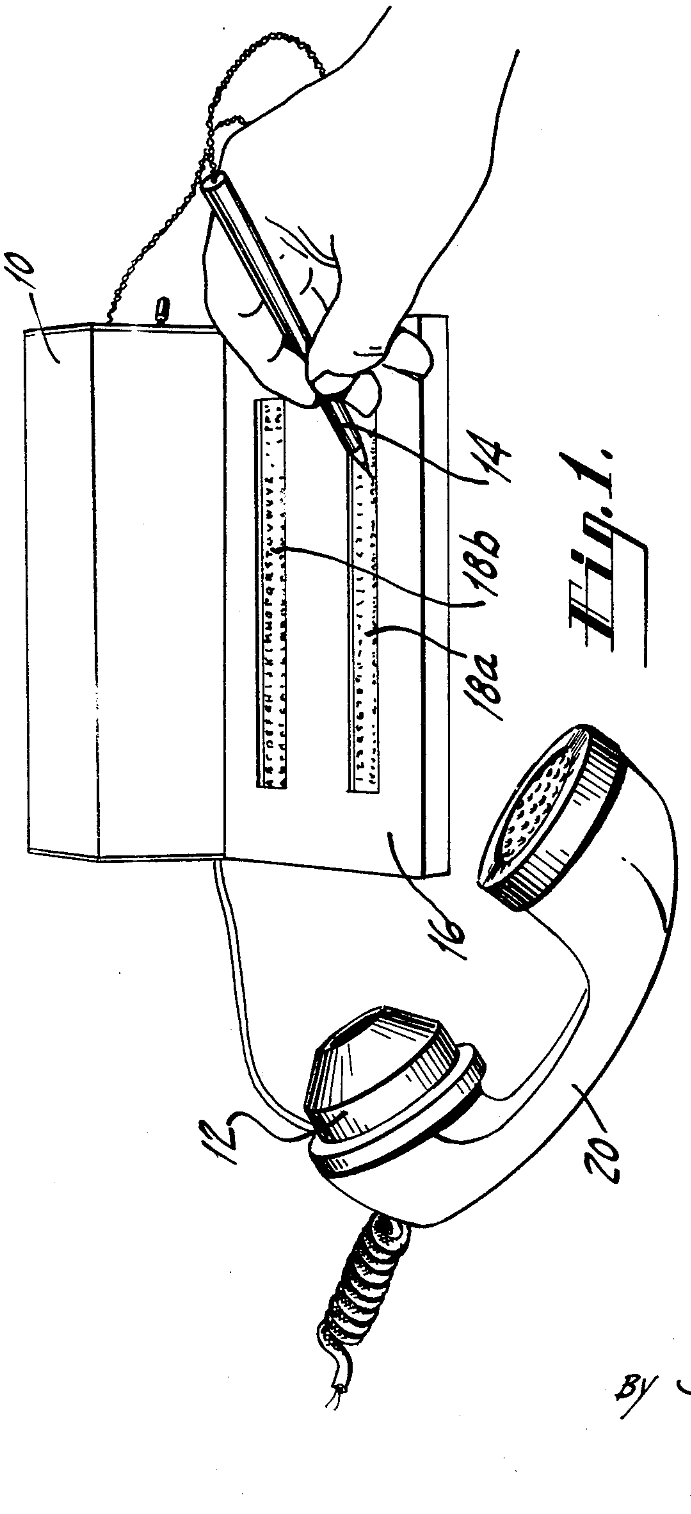
FIG. 1 is a pictorial view of the device shown connected to the handset of a telephone.

The input device, as illustrated in FIG. 1, comprises a circuit and keyboard unit 10, a speaker 12 connected to the output of unit 10, and a manually operated selection pen 14. On an exposed surface or panel 16 of unit 10 are located one or more "electrical keyboards" 18*a*, 18*b* (to be described) on which, or through which are visually displayed all of the characters available for selection. A "character," as the term is used here and in the appended claims, may include numbers, upper and lower case letters, symbols, punctuation marks, special printing characters and nonprinting control characters.

To establish contact with a remote computer, the user picks up any conventional telephone handset 20 and snaps or clamps speaker 12 onto the speak-in side of the handset 20. He then calls the computer by dialing its number by the conventional dialing method. After connection has been established, messages are inputed to the computer via the keyboard, character-by-character serially, by touching the tip of the selection pen 14 to the selected characters in a "hunt and peck" mode. A pressure actuated switch in pen 14 initiates a cycle of events in the circuits of unit 10 upon each contact of the pen tip with the keyboard, whereupon the correct character signals are transmitted to the speaker 12 and then over the telephone line to the computer.

Figure 2:
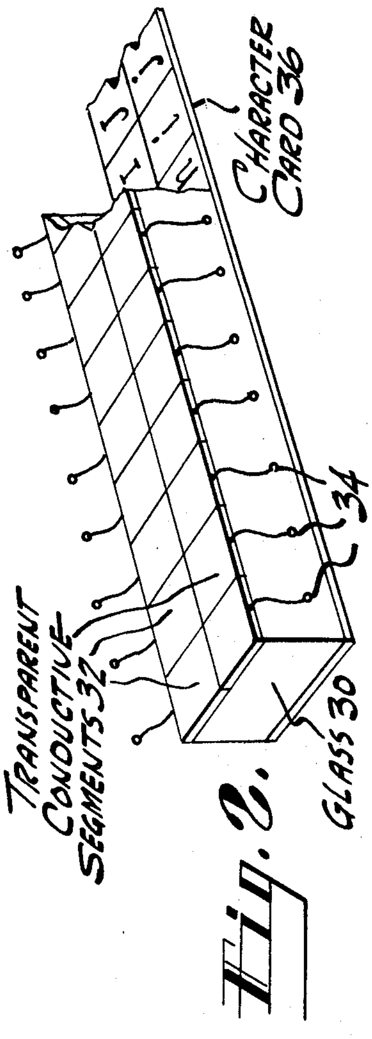
FIG. 2 is a partial view, in perspective, of one form of electronic keyboard.

The keyboard or keyboards comprise a plurality of individual, electrically conductive, fixed segments or "keys," one for each character, which segments are insulated from one another. A preferred form of keyboard is illustrated in partial, enlarged view in FIG. 2 and comprises a thin glass plate or substrate 30 on the top surface of which are affixed the individual conductive segments 32. These segments preferably are transparent conductive coatings of material such as tin oxide, known in the art as Tic. These segments may be formed by depositing a continuous layer of Tic on the surface of the thin glass plate 30, and thereafter scribing or etching lines through the Tic to provide individual segments 32 which are insulated from one another by an air gap.

Electrical connections may be made to the individual segments 32 by soldering leads 34 thereto. The combined glass plate 30 and segments 32 overlie a card 36 on which is printed the corresponding characters which may be selected. The printed characters are visible from the top of the keyboard through the segments 32 and glass 30. An advantage of this arrangement is that the codings of the various characters may be changed at will by reinserting a different printed card 36 in the keyboard.

As an alternative, the keyboard or keyboards may comprise a plurality of thick metallic segments, insulated from one another, and having embossed thereon the corresponding characters for visual display to the user. This arrangement is not as flexible as the arrangement of FIG. 2 since the embossing cannot be changed.

Figures 6, 7:
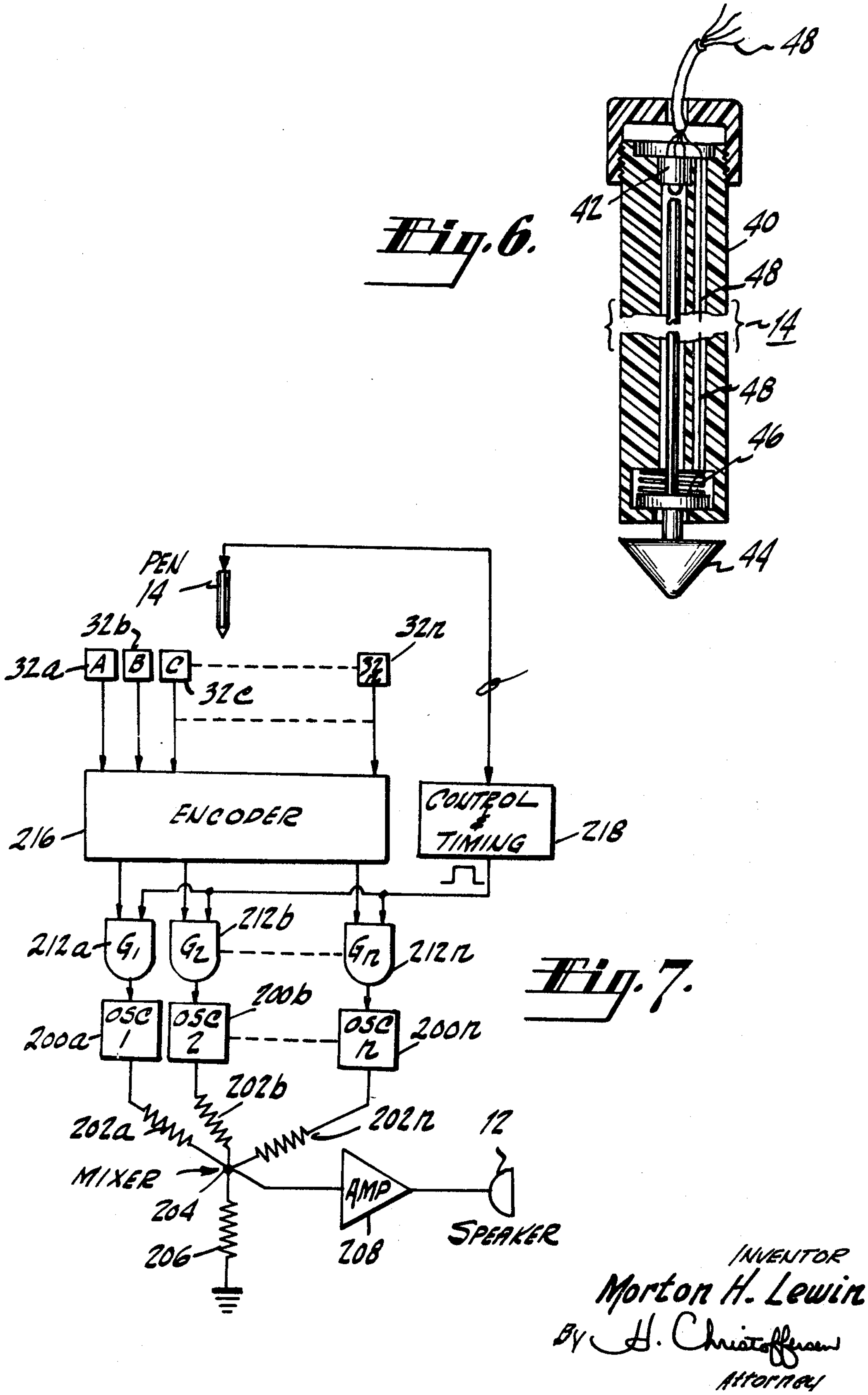
FIG. 6 is an enlarged view, in cross-section, of a suitable form of pen for operating the keyboard.
FIG. 7 is a block diagram of a logic system for the bit-by-bit parallel generation of a character to be transmitted.

The selection pen 14 may take the form illustrated in cross-section in FIG. 6. As there illustrated, the barrel 40 of the pen has a longitudinal, central bore at the top of which is located a small microswitch 42. The pen tip 44 is an electrical conductor and has attached thereto, at its upper end, a nonconducting shaft which extends into the bore of the barrel 40 and which depresses the button on the microswitch 42 when the tip of the pen is depressed. Ordinarily, the tip 44 is biased outwardly from the barrel 40 by a compression spring 46. A lead 48 extends from the tip 44 and through the barrel 40, emerging at the top thereof.

DETAILED DESCRIPTION OF THE SYSTEM

Figure 3:
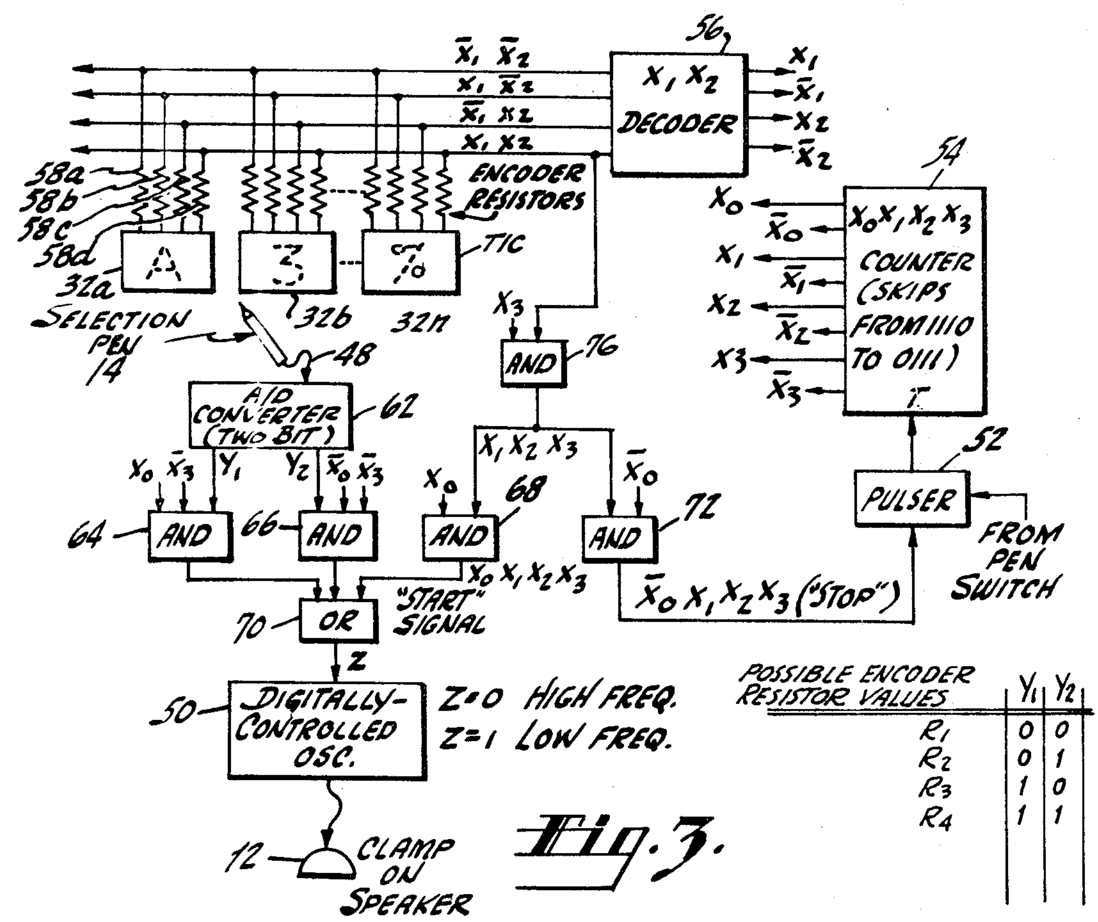
FIG. 3 is a block diagram of a logic system that may be employed to control an oscillator for bit-by-bit serial generation of a character to be transmitted.

FIG. 3 is a detailed block diagram of a preferred form of system for generating the characters serially by bit, i.e., the individual "bits" of a selected character are generated serially. Because of the relatively narrow frequency response of a conventional telephone line, the possibility of noise spikes on the line, etc., it is desirable to generate the characters in the form of tone codes or bursts, wherein any bit of a character may have either a first frequency or a second frequency. For this purpose, the system employs as the character signal generating means a digitally controlled oscillator 50 which, depending upon the input thereto, generates signals of either a first frequency or a second frequency. The logic for controlling the oscillator now will be described.

A pulse source 52, which may be, for example, an astable multivibrator, has its output applied to the trigger input of a decade counter 54. Pulser 52 normally is maintained in an inactive state, and is triggered into operation when the microswitch 42 (FIG. 6) in the pen is closed momentarily. Pulser 52 then generates a series of equal duration pulses until the pulser is again deactivated upon a particular count being reached in counter 54.

Counter 54 comprises four cascaded flip-flops $X_0$, $X_1$, $X_2$, and $X_3$, with feedback connections to allow a skip in the count sequence from state $X=1110$ to state $X=0111$ (where $X=X_0, X_1, X_2, X_3$) and $X_0$ is the least significant bit, e.g., the $2^0$ bit. The X output of any stage is a binary "1" when that stage is set and the $\overline{X}$ output thereof then is a binary "0." The outputs have the opposite significance when the stage is in the reset state. By way of example, $X_0=1$ and $\overline{X}_0=0$ when the least significant stage is in the set state. When the system is at rest, i.e., no characters are being generated, the output of the counter is $X=0111$ due to the feedback connections aforementioned.

The outputs $X_1$, $X_2$ and their complements $\overline{X}_1$, $\overline{X}_2$ from the decade counter 54 are applied to a decoder 56. Other outputs from the decoder are applied as inputs to AND gates, to be described. Decoder 56 has four output lines, only one of which is energized (binary "1") at any one time. For example, the top line is energized only when the inputs $\overline{X}_1$ and $\overline{X}_2$ to the decoder 56 are binary "1." This condition is fulfilled whenever the $2^1$ and $2^2$ stages in the counter 54 are in the reset state.

Each of the conductive segments 32*a* . . . 32*n* of the keyboard is connected to each of the output lines of the decoder 56 by way of a different encoding resistor. For example, conductive segment 32*a* is connected to the four output lines of the decoder 56, from top line to bottom output line thereof, by resistors 58*a* . . . 58*d*, respectively. The same is true for each of the other conductive segments. Each of these resistors may have any one of four values, one of which is infinity, and the combination of values for each different set of resistors is different from that of any other set.

The tip of the pen 14 is electrically connected by lead 48 to the input of a translation circuit as means such as a two-bit analog-to-digital converter 62 which has two outputs, designated $Y_1$ and $Y_2$. Output $Y_1$ is applied as one input to a first AND gate 64, which gate also receives as inputs the outputs $X_0$ and $\overline{X}_3$ from the counter 54. Converter output $Y_2$ is applied as one input to a second AND gate 66, the other inputs to which are the outputs $\overline{X}_0$ and $\overline{X}_3$ from counter 54. The outputs of these two AND gates 64, 66 and the output of a third AND gate 68 are applied as inputs to an OR gate 70, the output of which controls the oscillator 50. A fourth AND gate 72 has its output connected to the control input of the pulser 52. Gate 68 receives as one input the $X_0$ output of the counter 54 and AND gate 72 receives as one input the $\overline{X}_0$ output of the counter. A second input to each of these gates is the output of a fifth AND gate 76. The latter gate receives the $X_3$ output of the decoder and the $X_1$ and $X_2$ outputs thereof, which, for convenience, are derived from the bottom output line of the decoder 56.

Figure 4:
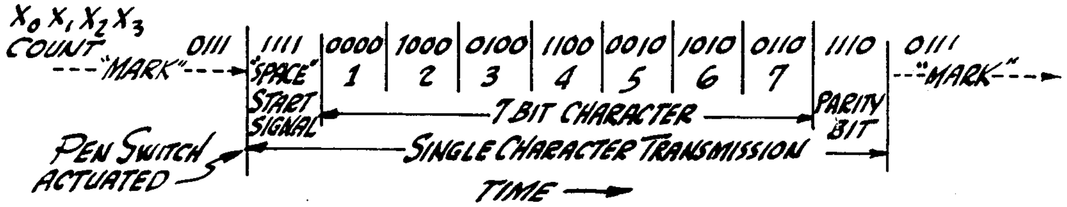
FIG. 4 is a timing diagram useful in describing the operation of the system of FIG. 3.

Consider now the operation of the FIG. 3 system, with reference to the timing diagram of FIG. 4. Selection pen 14 normally is not in contact with any of the conductive segments 32*a* . . . 32*n*, whereby there is not input to the *A/D* converter 62. As mentioned previously, counter 54 is in the state $X=0111$ at this time, whereby all of the inputs to fourth AND gate 72 are enabled (equal to binary "1"). The resulting "1" output of gate 72 applies a disabling level to the pulse source 52 to bias the pulse source off. Also, for a count of 0111 stored in the counter 54, each of the AND gates 64, 66 and 68 has at least one binary "0" input, whereby the output of these gates and the OR gate 70 is a binary "0." For this condition, the oscillator oscillates at a first given frequency, which may be its higher frequency level and may have a value, for example, of 1270 Hz. This output condition of the oscillator may be considered to be the "mark" condition.

The selection pen 14 serves two functions. First, when its tip is brought into contact with one of the conductive segments 32*a* . . . 32*n*, it provides a direct conduction path from that segment to the *A/D* converter 62. The input current to the converter then is a function of which decoder 56 output is a binary "1," and the value of the corresponding resistor connected from that output and through the selected conductive segment to the tip of the pen. Second, the pressure actuated switch in the pen generates a signal when the tip of the pen is depressed upon contact with a conductive segment, and the signal causes the normally held-off pulse source 52 to start its cycle of operation. Thus, when a character is selected and the tip of the pen 14 is brought into contact with the corresponding conductive segment, the pulse source 52 is turned on for its first pulse, and the counter 54 is advanced to count $X=1111$.

For this output condition of the counter 54, the output of the fourth AND gate 72 becomes a binary "0," which removes the blocking level from the pulse source 52 to allow the pulse source to generate a series of pulses. Also, the output of the third AND gate 68 now is a binary "1," and the resulting "1" output of OR gate 70 switches the oscillator 70 to its second frequency state, which may be, for example, 1070 Hz., corresponding to a "space." This first space signal informs the computer that a character is being transmitted.

The next pulse output from source 52 triggers the counter to a state $X=0000$. Let it be assumed that the pen 14 is contacting conductive segment 32*a* at this time. The output $\overline{X}_1\overline{X}_2$ of decoder 56 now is a binary "1," and a current flows through resistor 58*a*, conductive segment 32*a* and pen 14 to the *A/D* converter 62. The amount of current which flows is a function of the value of the resistor 58*a*, and, as mentioned previously, this resistor may have any one of four values, i.e., $R_1$, $R_2$, $R_3$ or $R_4$. These values are so selected so that the outputs $Y_1$ and $Y_2$ of the converter 62 may have any of the set of values listed in the table adjacent the oscillator. If the value $Y_2$ is a binary "1" at this time, AND gate 66 becomes fully enabled, the output of OR gate is a "1" and the oscillator will generate the lower frequency signal.

During this counter 54 state and the states corresponding to the next seven counts therein, the current into the *A/D* converter is proportionate to the value of that resistor belonging to the selected character and chosen by the value of $X_1$ and $X_2$. In each case, the current is converted into signals $Y_1$ and $Y_2$ which, in turn, are alternately selected by the $X_0$ and $\overline{X}_0$ outputs of the counter applied to gates 64 and 66, respectively. In this way, for the eight counts $X=0000$ to $X=1110$ following the "start" count ($Y=1111$), all four resistors associated with the selected character are selected, one at a time, by the decoder 56 for two counts each, and the resistor value information, in turn, controls the output tone sequence from the oscillator 50 (refer to FIG. 4). During the eighth counter period ($X=1110$), parity for the selected character is generated automatically by the appropriate resistance value.

When the count reaches $X=1110$, the next output from pulse source 52 switches the counter to the state $X=0111$, because of the feedback connections therein. The output of OR gate 70 then becomes and remains a binary "0," and the oscillator generates the higher frequency signal. Also, the output of the fourth AND gate 72 becomes a binary "1," and this output biases off the pulse source 52 to prevent the generation of further pulses until such time as the tip of the pen 14 is brought into contact with another conductive segment, or is again brought into contact with the same segment.

Because the pulse source 52 generates pulses of equal duration, each of the "START," character bits, and parity bit outputs in the generated sequence has the same fixed duration. It will be recognized that the tip of the pen must remain in contact with the segment of the selected character throughout the generation of that character. By way of example, if the width of a pulse output from pulse source 52 is 9.09 milliseconds, then the tip of the pen must remain in contact with the selected character segment 32*a* . . . 32*n* for the 82 milliseconds that it takes to transmit the character. This time is short enough so that it does not prevent a user from "hunting and pecking" at his maximum rate.

In the system of FIG. 3 as described, the several bits of a character are generated serially by bit employing a single oscillator of controllable frequency. It will be recognized that, without departing from the spirit of the invention, an oscillator of a single frequency may be employed, and the output of OR gate 70 may be used to gate the output of this oscillator selectively to the speaker 12 for transmission over the telephone line. Also, where high quality telephone lines are available, the system may be modified by employing the output of OR gate 70 to trigger a pulse source, such as a one-shot multivibrator, rather than controlling an oscillator.

Figure 5:
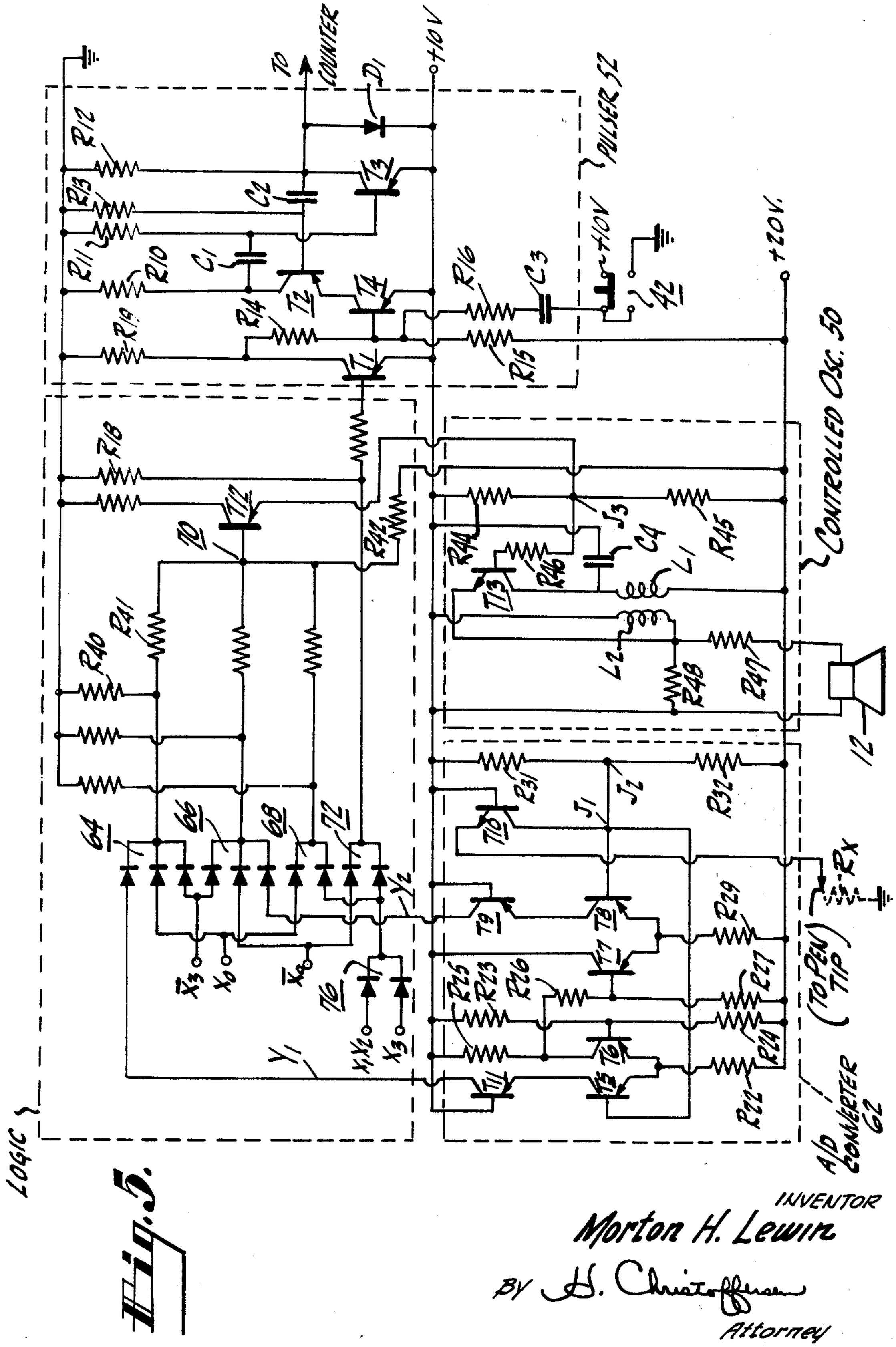
FIG. 5 is a schematic diagram of a portion of the FIG. 3 system.

FIG. 5 is a schematic diagram of a suitable pulser 52, A/D converter 62, oscillator 50 and the AND and OR gates 64 . . . 76 for use in the system of FIG. 3. These circuits assume a system of "negative logic," that is to say, one in which the binary "1" level is less positive than the binary "0" level. Thus, the AND and OR gates are negative AND and OR gates. In particular, it is assumed that a signal or level representing a binary "1" has a value of zero volts, and that a binary "0" signal or level has a value more positive than +10 volts.

Consider first the pulser 52, shown at the right of the drawing. This circuit comprises a control transistor $T_1$, and an astable multivibrator which includes transistors $T_2$, $T_3$ and $T_4$. Transistor $T_4$ has its emitter-collector path connected in series with the emitter-collector path of transistor $T_2$ and a resistor $R_{10}$, in that order, between a supply of +10 volts and circuit ground. A capacitor $C_1$ is connected between the collector of $T_2$ and the base of transistor $T_3$, and a resistor $R_{11}$ connects the base side of $C_1$ to reference ground. Transistor $T_3$ has its collector connected by way of a resistor $R_{12}$ to circuit ground, and by way of a capacitor $C_2$ to the base of transistor $T_2$. A resistor $R_{13}$ is connected between the latter base and circuit ground. With the exception of the transistor $T_4$, the astable multivibrator will be recognized as one which is fairly conventional in the art. Transistor $T_4$ is provided as one means of exercising control of the astable multivibrator in that this transistor, when biased off, disables the multivibrator. On the other hand, when $T_4$ is biased on, it presents a very low impedance in the emitter circuit of $T_2$ and allows this circuit to function as an astable multivibrator to generate pulses of fixed duration. The diode $D_1$ connected across the collector-emitter path of transistor $T_3$ prevents the voltage at the collector from going more positive than approximately +10 volts.

As mentioned previously, when the pen 14 (FIG. 1) is not being used, the state of the counter 54 is $X=0111$. All of the inputs to the AND gates 76 and 72 then are low (binary "1") and the voltage at the base of transistor $T_1$ is close to ground potential. This transistor $T_1$ then is biased in the on condition, and its output or collector voltage is close to +10 volts. This voltage biases off transistor $T_4$ via the voltage divider comprising resistors $R_{14}$ and $R_{15}$, so that the astable multivibrator is inactive and no pulses are generated.

The base of transistor $T_4$ also is connected by way of the series combination of a resistor $R_{16}$ and a capacitor $C_3$ to the microswitch 42 in the pen. The switch contact normally is connected to a source of +10 volts. When the tip of the pen is brought into contact with a conducting segment of the keyboard, the microswitch (shown schematically in FIG. 5) has its movable contact switched to a terminal of ground potential. A negative pulse or signal then is coupled through capacitor $C_3$ to the base of transistor $T_4$ and turns this transistor on to activate the multivibrator, whereby a pulse is generated. This pulse triggers the counter 54 (FIG. 3) to the state $X=1111$. Since $\overline{X}_0$ then is a binary "0" (>+10 volts), current flows through resistor $R_{18}$ and the upper diode of AND gate 72. The voltage at the base of transistor $T_1$ then is more positive than the emitter voltage, and $T_1$ turns off. The values of resistors $R_{19}$, $R_{14}$, and $R_{15}$ in the voltage divider are selected so that transistor $T_4$ is biased on when $T_1$ is biased off, and the astable multivibrator generates a series of pulses. In particular, the pulser 52 continues to operate until the count in counter 54 again reaches the state $X=0111$, at which time the output of gate 72 goes low, transistor $T_1$ turns back on, and transistor $T_4$ is turned off.

The schematic for the translation circuit A/D converter 62, is shown in the lower left-hand corner of FIG. 5. This converter comprises essentially two current steering gates, with the output of the first coupled to one input of the second. The first gate has a pair of transistors $T_5$ and $T_6$ with their emitters connected in common and by way of a resistor $R_{22}$ to a source of +20 volts. The collector of transistor $T_5$ has in series therewith the collector-emitter path of a further transistor $T_{11}$ which is operated as a common base amplifier, the collector voltage of which is output $Y_1$ of the converter. Transistor $T_6$ has its base connected to a point of fixed potential provided by a voltage divider comprising resistors $R_{23}$ and $R_{24}$. Transistor $T_5$ conducts when its base voltage is less positive than the fixed base voltage of $T_6$, and $T_6$ conducts when its base voltage is less positive than the base voltage of $T_5$. The output voltage of $T_6$ is developed across a collector resistor $R_{25}$. This output voltage is applied through a voltage divider comprising resistors $R_{26}$ and $R_{27}$ to the base of a transistor $T_7$ in the second current steering gate.

Transistor $T_7$ has its collector connected directly to the +10 volt source and has its emitter connected in common with the emitter of a transistor $T_8$ and by way of a common emitter resistor $R_{29}$ to the +20 volt source. A common base transistor $T_9$ has its emitter-collector path in the output circuit of transistor $T_8$, and the voltage at the collector of $T_9$ is the output $Y_2$ of the A/D converter. The base electrodes of the transistors $T_5$ and $T_8$ are connected to a common junction $J_1$ and to the junction $J_2$ of a voltage divider comprising resistors $R_{31}$ and $R_{32}$.

The conductive tip of the pen 14 is connected to the emitter of a common base transistor $T_{10}$, the collector of which is connected to the junctions $J_1$ and $J_2$. As mentioned previously, each conductive segment 32*a* . . . 32*n* (FIG. 3) is connected to the outputs of the decoder 56 by a set of four resistors. One or more of the resistors of a set may have a value of infinity, in which case that set of resistors may consist of less than four resistors. For the particular value of circuit components to be given hereinafter, the four resistor values are selected as 10K ohms, 15K ohms, 30K ohms, and infinity, and any one of the resistors of a set may have one of these values. The combination of values for any one conductive segment, however, is different from that of any other segment.

When any one of the decoder 56 outputs (FIG. 3) is a binary "1" (ground potential) and the pen is in contact with a conductive segment, the associated resistor is then connected in circuit between ground and the emitter of transistor $T_{10}$. This condition is exemplified by the dashed resistor $R_x$ in the drawing. The current supplied through this resistor to the emitter of transistor $T_{10}$ is a function of which one of the four values the resistor $R_x$ has. This current determines the voltage at junction $J_1$ and, in turn, the voltage applied at the base electrodes of transistors $T_5$ and $T_8$. Rather than attempting to describe the operation of the converter 62 for each of the four input resistance values, the operation of the circuit is summarized by way of the following table, which may be verified by calculations using the component values listed hereinafter.

| Resistor Value | $T_5$ | $T_6$ | $T_7$ | $T_8$ | $Y_1$ | $Y_0$ |
|---|---|---|---|---|---|---|
| 10K ohms | On | Off | Off | On | "0" | "0" |
| 15K ohms | On | Off | On | Off | "0" | "1" |
| 30K ohms | Off | On | Off | On | "1" | "0" |
| Infinity | Off | On | On | Off | "1" | "1" |

The AND gates and OR gate are illustrated in the upper left of the drawing. Each of the AND gates 64, 66, and 68 comprises a set of diodes, one diode for each input to the respective gate. The cathodes of the diodes in any one gate are connected together and by way of a resistor to circuit ground. The cathodes also are connected by way of a resistor to the base of $T_{12}$. By way of example, the cathodes of gate 64 are connected by a resistor $R_{40}$ to ground and by way of a resistor $R_{41}$ to the base of transistor $T_{12}$. In addition, a resistor $R_{42}$ is connected from the base of transistor $T_{12}$ to +20 volts and is, essentially, a summing resistor which provides the OR output for the AND gates 64, 66, and 68.

The voltage at the base of transistor $T_{12}$ is low only when all of the inputs to one of the gates 64, 66, and 68 are low (binary "1"). Transistor $T_{12}$ has its emitter connected to the junction $J_3$ of a pair of resistors $R_{44}$ and $R_{45}$ in the oscillator circuit 50 and controls the voltage at the base of the oscillator transistor $T_{13}$. This base voltage has a relatively high voltage value when all of the AND gates 64, 66, and 68 have a binary "0" output, and has a relatively low value of voltage whenever the output of any of these AND gates is binary "1." Thus, the output of the OR gate determines the bias for the transistor $T_{13}$, and thereby controls the oscillating frequency, in a manner to be described.

The oscillator 50 comprises the transistor $T_{13}$, as mentioned, whose base is connected by a resistor $R_{46}$ to the junction $J_3$. The collector of this transistor is connected by way of a capacitor $C_4$ to the +10 volt source, and by way of the primary coil $L_1$ to the +20 volt source. The secondary coil $L_2$ is connected between the emitter of $T_{13}$ and the +10 volt source. Speaker 12 has one end of its coil connected directly to the +10 volt source and has the other end thereof connected by way of a resistor $R_{47}$ to the emitter $T_{13}$.

The frequency of oscillations is a function of the capacitance of capacitor $C_4$ and the inductance of the primary winding $L_1$. The inductance of $L_1$, in turn, is a nonlinear function of the current flowing therethrough. Therefore, the frequency of oscillation is a function of the D.C. operating bias applied to the base of transistor $T_{13}$. Since this bias voltage is a function of the output of OR gate 70, it may be seen that the oscillating frequency either has a first value or a second value, depending upon whether the output of the OR gate 70 is a binary "1" or a binary "0."

By way of example only, the values of the various components in FIG. 5 may be as follows:

| Transistors | Capacitors |
|---|---|
| $T_1$–$T_9$, $T_{11}$, $T_{12}$—2N1307 | $C_1$, $C_2$, $C_3$—0.022 $\mu$f. |
| $T_{10}$—2N1306 | $C_4$—0.15 $\mu$f. |
| $T_{13}$—2N2102 | |

All diodes—1N34

| Resistors | |
|---|---|
| $R_{10}$, $R_{12}$—10K ohms | $R_{27}$—33K ohms |
| $R_{11}$—300K ohms | $R_{29}$—7.5K ohms |
| $R_{13}$—177K ohms | $R_{31}$—6.2K ohms |
| $R_{14}$—20K ohms | $R_{32}$—7.5K ohms |
| $R_{15}$—1 megohm | $R_{40}$—10K ohms |
| $R_{16}$—100K ohms | $R_{41}$—10K ohms |
| $R_{18}$—100K ohms | $R_{42}$—10K ohms |
| $R_{19}$—20K ohms | $R_{44}$—680 ohms |
| $R_{22}$—8.2K ohms | $R_{45}$—2.4K ohms |
| $R_{23}$—3.9K ohms | $R_{46}$—3K ohms |
| $R_{24}$—9.1K ohms | $R_{47}$—13 ohms |
| $R_{25}$—3.9K ohms | $R_{48}$—9.1 ohms |
| $R_{26}$—4.3K ohms | |

FIG. 7 is a block diagram of a further embodiment of the invention in which the several bits of a character are generated in parallel rather than sequentially. For this arrangement, a set of oscillators 200*a* . . . 200*n* are employed. The outputs thereof are coupled by way of resistors 202*a* . . . 202*n* to a summing point 204 at the junction of those resistors with a common resistor 206. The signal developed across resistor 206 is amplified in an amplifier 208 and applied to the speaker 12 for transmission over the telephone line.

Each of a set of coincidence gates 212*a* . . . 212*n* has its output applied to the control input of a different one of the oscillators to control the frequency thereof.

As in the case of FIG. 3, each of the oscillators may have either of two frequencies, which are different for each of the oscillators, the frequencies being so selected that there is no interference between the outputs from the oscillators. The gates 212$a$ . . . 212$n$, in turn, each receive a different output from a translation circuit or means such as an encoder 216, and each receives a second input from the control and timing network 218, to be described. The several inputs to the encoder 216 are electrically connected to different ones of the conductive segments 32$a$ . . . 32$n$ in the keyboard.

In the operation of the FIG. 7 arrangement, none of the outputs of encoder 216 is energized except when the pen 14 is in contact with one of the segments. Thus, all of the gates 212$a$ . . . 212$n$ normally are disabled, and the oscillators 200$a$ . . . 200$n$ generate signals at their higher levels.

When the tip of the pen 14 is brought into contact with one of the conductive segments 32$a$ . . . 32$d$, continuity is established via the pen 14 between that conductive segment and the control and timing unit 218. Also, the microswitch in the pen 14 is depressed to close the switch. The control and timing unit may contain a one-shot which is triggered by the closing of the microswitch in the pen. This pulse is applied to one input of each of the gates 212$a$ . . . 212$n$, and also is applied by way of the tip of the pen 14 to the contacted segment. The outputs of encoder 216 which correspond to the selected character, i.e. the selected segment, are energized and enable corresponding second inputs of various ones of the gates 212$a$ . . . 212$n$. Those gates which are fully enabled change the input voltages to the corresponding oscillators 200$a$ . . . 200$n$ to change the frequencies thereof to their lower levels.

Only one pulse is provided by the control and timing unit 218 to the gates 212$a$ . . . 212$n$ when the microswitch is depressed. Therefore, the frequencies of the oscillations corresponding to the selected character are changed only once during the character transmission, and the period of transmission is determined by the duration of the one-shot pulse output.

What is claimed is:

1. The combination comprising:

coded character signal generating means having an input;

an electronic keyboard having a plurality of conductive segments insulated from one another and each corresponding to a different generable character;

pulse source means having an output;

circuit means coupling said conductive segments to one of (a) said pulse source means output and (b) said character generating means input; and a pen having an electrically conductive tip for contacting said segments individually, and an electrical conductor connected in circuit between said tip and the remaining one of (a) said pulse source means output and (b) said character generating means input, for completing an electrical circuit therebetween via a contacted segment.

2. The combination as claimed in claim 1, wherein said pen includes a selectively operable switch for actuating said pulse source means.

3. The combination as claimed in claim 1, wherein said character generating means includes at least one oscillator, and a speaker coupled to receive the output of said oscillator.

4. The combination as claimed in claim 1, wherein said pen tip is coupled to the output of said pulse source means, wherein said character generating means comprises a set of oscillators, and wherein said segments are coupled to said oscillators by way of an encoder.

5. In combination:

oscillator means;

logic means responsive to a plurality of input signals representing the binary digits of a character for applying outputs to said oscillator means for causing the latter to produce oscillations indicative of the character;

a character entry keyboard having a plurality of conductive segments insulated from one another and each corresponding to a different character;

a translation circuit; and means including a movable pen having an electrically conductive tip for contacting said segments individually and for producing a signal when in contact with a segment for causing to be applied from said contacted segment to said logic means via said translation circuit a plurality of signals representing the binary digits of the character identified by said segment.

6. The combination as claimed in claim 5 wherein said pen includes selectively operable switch means for producing said signal when in contact with a segment.

7. The combination as claimed in claim 5 wherein said oscillator comprises a variable frequency oscillator and includes means for determining the frequency produced thereby and wherein said logic means is connected to control said last named means.

8. The combination as claimed in claim 5 wherein said translation circuit comprises an analog-to-digital converter and wherein said keyboard further includes a plurality of conductors for receiving sequential pulses and circuit means coupling each segment to said conductors through a separate set of input resistors, where the resistors of each set have a different combination of values.

9. The combination as claimed in claim 8 further including a counter for producing successive counts, decoder means connected to and responsive to said counts, and said conductors comprising at least some of the output leads of said decoder means.

10. In combination:

a keyboard having a plurality of keys, each key representing a different character;

character signal generating means responsive to a coded input signal corresponding to the selection of a key for producing an output indicative of the character represented by the key;

a translating circuit comprising analog-to-digital conversion means coupled to said character signal generating means for applying to the latter the coded signal called for by the selection of a key;

key selection means comprising a manually operated pen for placing one key in circuit with said translating circuit when said pen is placed in contact with that one key, for causing said translating circuit to produce the coded signal indicative of the character represented by that key; and means for concurrently applying to each key a different group of time sequential pulses, each such group of pulses having different possible amplitude levels and each such group representing a different character, said pen, when in contact with the key, conducting the pulses applied to that particular key to said translating circuit.

11. In combination:

a keyboard having a plurality of keys, each key representing a different character;

character signal generating means responsive to a coded input signal corresponding to the selection of a key for producing an output indicative of the character represented by the key;

a translating circuit coupled to said character generating means for applying to the latter the coded signal called for by the selection of a key, said translating circuit comprising an encoder responsive to a pulse applied to a key for producing a coded output signal representing the character identified by that key; and key selection means comprising a manually operated pen for placing one key in circuit with said translating circuit when said pen is placed in contact with that one key, for causing said translating circuit to produce the coded signal indicative of the character represented by that key, said pen including means for applying a pulse to a key when said pen is placed in contact with said key.

12. In combination:

means responsive to an enabling signal for concurrently producing at a plurality of output terminal means, signals indicative of a corresponding plurality of characters;

a keyboard having a plurality of keys, each key coupled to a different output terminal means;

generating means responsive to signals indicative of a character for translating said signals to a form suitable for transmission; and manually operated pen means for producing said enabling signal and applying it to said first-named means and for applying the signals present on a key to said generating means, both when placed in contact with a key.

13. The invention as set forth in claim 12, wherein said first-named means comprises a counter, and a decoder coupled to said counter for producing decoded outputs indicative of the successive counts produced by said counter, and wherein each output terminal means comprises a group of terminals coupled through impedance means to said decoder, each group of terminals for producing outputs indicative of a different character.

14. The invention as set forth in claim 13, wherein each group of terminals is connected to receive the same group of decoded outputs, but through a group of impedance means having a different combination of values.

15. In the combination as set forth in claim 12, said means responsive to an enabling signal producing at each output terminal means a group of successive signals, each such group of signals having a different combination of amplitude levels.

16. In the combination as set forth in claim 15, said generating means including an oscillator which is capable of oscillating at one of two different frequencies and further including means for controlling the frequency of said oscillator as a function of the successive amplitude levels of the signals present at any key.

17. In the combination as set forth in claim 16, said means for controlling the frequency of said oscillator including analog-to-digital converter means and logic gate means responsive to the output of said analog digital converter means and connected to control the frequency of said oscillator.

18. In the combination as set forth in claim 11, said coded output signal comprising a group of concurrent signals.

19. For use with a conventional telephone headset having a transmitter, the combination comprising:

a keyboard which includes a plurality of keys, each representing a different character, and each connected to receive a different group of successive levels of voltage;

means including oscillator means coupled to said transmitter and responsive to the selection of a key for causing successive tones indicative of the character represented by the key to be transmitted to said transmitter;

a device adapted to be held in the hand for selecting the keys one at a time;

voltage responsive means coupled to said oscillator for causing it to produce tones in a code corresponding to successive voltages applied to said voltage responsive means; and wherein said device adapted to be held in the hand includes means for conducting the voltages present on a selected key to said voltage responsive means.

References Cited

UNITED STATES PATENTS

| | | | |
|---|---|---|---|
| 3,424,870 | 1/1969 | Breeden | 179—84 |
| 3,383,467 | 5/1968 | New | 179—2 |
| 3,381,276 | 4/1968 | James | 340—172.5 |
| 3,277,243 | 10/1966 | Fairbairn | 179—81 |
| 3,299,207 | 1/1967 | Cooke | 179—1 |
| 3,423,528 | 1/1969 | Bradshaw | 178—19 |
| 3,410,956 | 11/1968 | Grossimon | 178—19 |
| 3,399,401 | 8/1968 | Ellis | 340—324 |
| 3,347,986 | 10/1967 | Gilbert | 340—365 |

KATHLEEN H. CLAFFY, Primary Examiner

T. J. D'AMICO, Assistant Examiner

U.S. Cl. X.R.

340—365